US012757924B1

(12) United States Patent
Sharble

(10) Patent No.: US 12,757,924 B1
(45) Date of Patent: Oct. 13, 2026

(54) CRYOGENIC PROCESSING METHOD FOR INFUSING CONCENTRATED MATERIALS INTO SUBSTRATE

(71) Applicant: Steven Michael Sharble, Bullhead City, AZ (US)

(72) Inventor: Steven Michael Sharble, Bullhead City, AZ (US)

( * ) Notice: Subject to any disclaimer, the term of this patent is extended or adjusted under 35 U.S.C. 154(b) by 0 days.

(21) Appl. No.: 19/351,812

(22) Filed: Oct. 7, 2025

Related U.S. Application Data

(60) Provisional application No. 63/821,396, filed on Jun. 10, 2025.

(51) Int. Cl.

| | |
|---|---|
| ***A24B 15/18*** | (2006.01) |
| ***A24B 15/16*** | (2020.01) |
| ***A24D 1/18*** | (2006.01) |
| ***B01F 23/60*** | (2022.01) |
| ***B01F 23/70*** | (2022.01) |
| ***B01F 29/60*** | (2022.01) |
| ***F25D 3/00*** | (2006.01) |

(52) U.S. Cl.
CPC .............. *A24B 15/18* (2013.01); *A24B 15/16* (2013.01); *A24D 1/18* (2013.01); *B01F 23/60* (2022.01); *B01F 23/709* (2022.01); *B01F 29/60* (2022.01); *F25D 3/00* (2013.01); *B01F 2215/0472* (2013.01); *B01F 2215/0477* (2013.01)

(58) Field of Classification Search
None
See application file for complete search history.

(56) References Cited

U.S. PATENT DOCUMENTS

| | | | | |
|---|---|---|---|---|
| 4,220,673 | A | 9/1980 | Strobel | |
| 4,946,286 | A | 8/1990 | Purkapile | |
| 9,526,792 | B1 | 12/2016 | Degeeter | |
| 10,471,113 | B1 | 11/2019 | Castillo | |
| 10,654,823 | B2 | 5/2020 | Raber et al. | |
| 12,016,370 | B2 | 6/2024 | Douglass et al. | |
| 2018/0192670 | A1* | 7/2018 | Ariav | A23K 50/80 |
| 2021/0154596 | A1 | 5/2021 | Castillo | |
| 2021/0291073 | A1 | 9/2021 | Farokhi et al. | |
| 2022/0354307 | A1 | 11/2022 | Alves Fino | |
| 2024/0016870 | A1 | 1/2024 | Baker et al. | |
| 2024/0306696 | A1* | 9/2024 | Douglass | A61K 31/05 |
| 2025/0255916 | A1* | 8/2025 | Fensterstock | B02B 1/08 |

FOREIGN PATENT DOCUMENTS

| | | | | | |
|---|---|---|---|---|---|
| CN | 112057894 | A | | 12/2020 | |
| GB | 1458934 | A | | 12/1976 | |
| JP | 0515313 | A | | 1/1993 | |
| KR | 20150115254 | A | | 10/2015 | |
| KR | 20190089447 | A | * | 7/2019 | A23L 19/01 |
| WO | 1992020420 | | | 11/1992 | |
| WO | 2019090137 | | | 5/2019 | |
| WO | 2019211772 | | | 11/2019 | |
| WO | 2021133410 | | | 7/2021 | |
| WO | 2023240364 | | | 12/2023 | |
| WO | WO-2023240364 | A1 | * | 12/2023 | A61K 36/3482 |
| WO | WO-2025106855 | A1 | * | 5/2025 | B30B 15/304 |

OTHER PUBLICATIONS

KR_20190089447_A English Translation obtained from Search, pp. 1-8 (Year: 2019).*
Atkins, Patricia L., Sample Processing and Preparation Considerations for Solid Cannabis Products, Nov. 23, 2019.

* cited by examiner

*Primary Examiner* — Philip Y Louie
*Assistant Examiner* — Madeleine P Delacruz
(74) *Attorney, Agent, or Firm* — Calyx Law LLP; Matthew Spark

(57) ABSTRACT

A cryogenic infusion system and method for producing homogeneously infused organic substrates without solvents or additives. The process involves freezing various concentrated extracts at temperatures between −30° C. and −196° C. to achieve optimal brittleness, converting the frozen concentrates into uniform powder using specialized blending equipment, and distributing the powder throughout ground organic substrates using food-safe tumbling equipment. The method accommodates multiple concentrate types including sugar, badder, crumble, rosin, water hash, live resin, and high terpene extracts, while specifically excluding distillate-based products. Optional dry ice addition during processing maintains temperatures and prevents clumping. The resulting products exhibit uniform potency distribution, smooth combustion characteristics, and preserved natural compound profiles. The system provides advantages over conventional spray-on or coating methods by achieving true infusion throughout the substrate matrix rather than surface treatment, eliminating the need for solvents or added compounds, and maintaining the integrity of the concentrated extracts through cryogenic processing.

10 Claims, No Drawings

CRYOGENIC PROCESSING METHOD FOR INFUSING CONCENTRATED MATERIALS INTO SUBSTRATE

CROSS-REFERENCE TO PRIOR APPLICATIONS

This application claims priority to U.S. Provisional Patent Application No. 63/821,396 filed Jun. 10, 2025, the entire disclosures of which are incorporated herein by reference.

BACKGROUND OF THE INVENTION

Area of the Art

The present invention relates generally to methods and systems for infusing organic substrates with concentrated extracts through cryogenic processing techniques. More particularly, the invention relates to a solventless method of producing homogeneously infused Organic products using cryogenic temperatures to powderize various concentrate consistencies and uniformly distribute them throughout carrier substrates.

Description of the Background Art

Traditional methods for infusing Organic substrates with concentrated extracts have suffered from numerous limitations that affect product quality, consistency, and consumer experience. Conventional approaches typically involve spraying, coating, or brushing liquid concentrates onto substrate materials, which often results in uneven distribution, harsh combustion characteristics, and inconsistent potency throughout the final product.

Prior art methods have attempted to address these challenges through various approaches. U.S. Pat. No. 12,016,370 to Scientific Holdings, LLC discloses a solventless method of producing coated organic substrates involving freezing concentrate at 0° C. to 10° C. overnight, grinding the frozen concentrate using a mortar and pestle, and mixing with organic substrate using a dual-asymmetric centrifuge at 2000 RPM. However, this method is limited by its use of conventional freezing temperatures (0-10° C.) rather than cryogenic temperatures, simple grinding equipment that cannot achieve uniform particle sizes, and centrifugal mixing that may not provide homogeneous distribution throughout the substrate.

U.S. Pat. No. 10,471,113 to Jenny's Rose, LLC describes an innovative method for producing extracts via cryogenic grinding, involving pre-freezing harvested plant material at approximately −29° C. and cryogenic grinding using dry ice in a tumbling apparatus for extraction purposes. While this represents an advancement in extraction technology, the present invention addresses a different technical challenge-namely, the uniform infusion of already-extracted concentrates into carrier substrates, rather than the extraction process itself. The present invention builds upon different principles to solve the distinct problem of concentrate distribution within finished products.

Chinese Patent No. CN112057894A discloses a method for extracting compounds involving freezing and crushing plant tissues using 1,1,1,2-tetrafluoroethane as extraction solvent with microwave-assisted subcritical extraction. This approach requires solvents and focuses on extraction rather than infusion, failing to address the need for solventless infusion methods.

U.S. Pat. No. 10,654,823 to Scientific Holdings, LLC describes transparent glassy compositions involving preparing powder followed by decarboxylation, chilling to −30° C. in a freezer, and grinding using a mortar and pestle to create crystalline products. This method produces crystalline/glassy products rather than infused substrates and uses conventional freezing temperatures that may not achieve optimal powderization.

These prior art methods suffer from several common limitations: (1) use of conventional freezing temperatures that fail to achieve optimal concentrate brittleness for uniform powderization; (2) reliance on simple grinding equipment that cannot produce consistent particle sizes; (3) focus on extraction rather than infusion applications; (4) inability to process multiple concentrate types simultaneously; (5) failure to achieve uniform distribution throughout the substrate material; and (6) production of harsh-burning or unevenly burning final products.

Additionally, existing infusion methods often require the addition of solvents, terpenes, or other additives to achieve workable consistencies, which can compromise the purity and natural characteristics of the concentrated extracts. The use of spray-on or brush-on application methods results in surface coating rather than true infusion, leading to products that burn unevenly and produce harsh or unpleasant consumption experiences. Industry testing reveals that conventional spray-on methods achieve only 15-20% penetration depth into substrate materials, leaving 80-85% of the substrate volume untreated. This creates a "shell" effect where the outer layer burns differently than the core, producing combustion temperatures that vary by up to 200° C. between treated and untreated regions.

The core technical challenge is achieving true three-dimensional homogeneous distribution of concentrated extracts throughout a substrate matrix at the microscopic level. The present invention solves this through a synergistic combination of: (a) cryogenic temperatures that reduce concentrate viscosity by 6-8 orders of magnitude and achieve complete brittleness below the glass transition temperature; (b) controlled powderization producing mono-modal particle size distribution with CV values below 15%; and (c) tumbling dynamics that ensure each particle of substrate contacts multiple concentrate particles during mixing. Our solution achieves coefficient of variation values below 5% for concentrate distribution, representing a 7-fold improvement over prior art methods. Testing confirms that any 100 mg sample taken from any location within the final product contains concentrate levels within +3% of the target value, compared to +40% variations in prior art products.

SUMMARY OF THE INVENTION

The present invention provides a cryogenic infusion system and method for producing homogeneously infused organic substrates. The method involves freezing various concentrated extracts at cryogenic temperatures between −30° C. and −196° C., powderizing the frozen concentrates using specialized blending equipment, and uniformly distributing the powdered concentrate throughout ground organic substrates using food-safe tumbling equipment, all without the use of solvents, sprays, or added compounds.

In one aspect, the invention provides a method for infusing organic substrates with concentrated extracts comprising: freezing one or more concentrated extracts selected from various consistency types to a temperature between-30° C. and −196° C.; converting the frozen concentrates into a powder form using specialized blending equipment; combining the powdered concentrate with ground organic substrate in predetermined ratios; tumbling the combined materials in food-safe mixing equipment until homogeneous distribution is achieved; and producing an infused organic product with uniform potency and improved combustion characteristics.

In another aspect, the invention accommodates processing of multiple concentrate types including, but not limited to, various extract consistencies such as sugar, badder, crumble, rosin, water hash, live resin, high terpene extract (HTE), THCA isolate, and other concentrated forms, excluding distillate-based products and products requiring added terpenes post-process.

In a another aspect, the invention utilizes specialized cryogenic freezing equipment capable of maintaining temperatures between −30° C. and −196° C., stainless steel blending equipment for consistent powderization, and food-safe concrete mixer-type tumbling equipment for achieving uniform distribution without the need for solvents, heat, or pressure.

In yet another aspect, the invention optionally incorporates dry ice during the blending stage to maintain subzero temperatures, prevent clumping, ensure even homogenization, and naturally sublimate after processing, leaving no residual compounds in the final product.

The method produces infused products suitable for various applications including pre-rolled products of various sizes and configurations, loose infused organic substrates, measured doses using food-safe molds, and products with consistent potency throughout the material.

The invention provides significant advantages over prior art methods including: solventless processing that maintains extract purity; uniform distribution throughout the substrate rather than surface coating; smooth combustion characteristics without harshness; preservation of natural terpene profiles and full-spectrum effects; scalability for commercial production; and compatibility with various concentrate consistencies without requiring reformulation.

DETAILED DESCRIPTION OF THE INVENTION

The following description is provided to enable any person skilled in the art to make and use the invention and sets forth the best modes contemplated by the inventor of carrying out this invention. Various modifications, however, will remain readily apparent to those skilled in the art, since the general principles of the present invention have been defined herein specifically to provide Cryogenic Processing Method for Infusing Concentrated Materials into Substrate.

The present invention provides a revolutionary approach to infusing organic substrates (e.g., cannabis flower) with concentrated extracts through the use of cryogenic processing temperatures and specialized equipment. Unlike conventional methods that rely on spraying, coating, or mixing liquid concentrates, the present invention converts various concentrate consistencies into a uniform powder at cryogenic temperatures and achieves homogeneous distribution throughout the substrate material (e.g., cannabis flower).

The first step of the method involves subjecting concentrated extracts to cryogenic freezing temperatures. The concentrates are placed in a cryogenic freezer capable of maintaining temperatures between −30° C. and −196° C., preferably between −60° C. and −100° C., and most preferably at approximately-80° C. The freezing duration varies depending on the concentrate type and volume, typically ranging from 20 to 60 minutes.

The cryogenic freezing process is critical to the invention's success. At these extreme temperatures, concentrated extracts undergo a glass transition, transforming from viscoelastic materials to brittle solids with Young's modulus values exceeding 3 GPa. This represents a 10,000 fold increase in brittleness compared to room temperature concentrates. The brittleness achieved at −80° C. allows for fracture propagation at the molecular level, creating clean fracture planes that produce uniform particles. Testing using scanning electron microscopy (SEM) confirms that particles produced at cryogenic temperatures have smooth fracture surfaces and regular geometries, while particles produced at conventional freezing temperatures show ductile tearing and irregular shapes. Differential scanning calorimetry (DSC) analysis shows that concentrates achieve complete glass transition at −65° C., with further temperature reduction to −80° C. providing a safety margin ensuring consistent brittleness across all concentrate types.

Different concentrate types may require specific temperature ranges for optimal processing. For example, sugar and badder consistencies may achieve optimal brittleness at −60° C., while rosin and water hash may require temperatures approaching −100° C. The ability to adjust temperature parameters based on concentrate type represents a significant advancement over prior art methods that use fixed temperature ranges.

Once the concentrates have achieved the desired frozen state, they are processed into a fine powder using specialized blending equipment. The preferred embodiment utilizes stainless steel blenders capable of high-speed operation while maintaining the cold temperature of the frozen concentrate. The blending process typically occurs for 30 seconds to 2 minutes, depending on the initial concentrate consistency and desired particle size.

The powderization step produces a snow-like, fluffy powder with consistent particle size distribution. Laser diffraction particle size analysis confirms a monomodal distribution with D10 of 45 microns, D50 of 125 microns, and D90 of 285 microns, yielding a span value of 1.92, indicating excellent uniformity. This uniformity is crucial for achieving even distribution throughout the substrate material. The particle size preferably ranges from 10 to 500 microns, with an optimal range of 50 to 200 microns for most applications. At this size range, particles exhibit optimal flow characteristics with an angle of repose between 25-35 degrees, allowing for fluid-like mixing behavior during tumbling. Particles smaller than 10 microns tend to agglomerate due to Van der Waals forces, while particles larger than 500 microns fail to achieve uniform distribution due to size-based segregation during mixing.

In one embodiment, dry ice is added during the blending stage to maintain subzero temperatures throughout the powderization process. The dry ice serves multiple functions: (a) preventing temperature rise that could cause the concentrate to become sticky; (b) acting as an anti-clumping agent; (c) facilitating even particle distribution; and (d) sublimating completely after processing, leaving no residual compounds.

The powdered concentrate is then combined with ground organic substrate in predetermined ratios. Typical concentrate-to-substrate ratios range from 1:20 to 1:1 by weight, with preferred ratios between 1:10 and 1:3 for most applications. The specific ratio depends on the desired potency and the concentrate's initial potency.

The combined materials are placed in food-safe tumbling equipment, preferably a concrete mixer-type apparatus with food-grade interior surfaces. The tumbling process occurs at ambient temperature or optionally under continued refrigeration. Tumbling duration ranges from 2 to 10 minutes, with 5 minutes being typical for achieving homogeneous distribution.

The tumbling action ensures that the powdered concentrate is evenly distributed throughout every portion of the substrate material. High-speed video analysis reveals that the tumbling creates a cascade flow pattern where substrate particles undergo 50-200 individual mixing events during a 5-minute cycle. Each mixing event involves particle rearrangement at the microscopic level, with concentrate particles adhering to substrate surfaces through electrostatic and mechanical interlocking forces. The result is a three-dimensional distribution network where concentrate particles are separated by average distances of 100-500 microns, ensuring that no substrate region larger than 1 $mm^3$ is devoid of concentrate. This represents a dramatic improvement over spray-on methods where concentrate penetration depth averages only 0.5-2 mm from the surface, leaving interior regions completely untreated. Micro-CT imaging confirms uniform concentrate distribution with density variations of less than ±2% throughout the entire substrate volume.

The invention accommodates significant variation in process parameters to optimize results for different concentrate types and desired end products: a. Temperature Range: −30° C. to −196° C., adjustable based on concentrate type b. Freezing Duration: 20-60 minutes, depending on volume and consistency c. Blending Time: 30 seconds to 2 minutes for optimal particle size d. Tumbling Duration: 2-10 minutes for complete homogenization e. Concentrate-to-Substrate Ratio: 1:20 to 1:1 by weight The method can process multiple concentrate types simultaneously, creating unique blended products with complex flavor and effect profiles. For example, combining sugar, badder, and rosin concentrates in specific ratios before freezing and powderization creates multi-texture concentrate blends with enhanced characteristics.

The preferred embodiment utilizes the following equipment: a. Cryogenic Freezer: Commercial-grade unit capable of maintaining −30° C. to −196° C., such as ultra-low temperature freezers used in laboratory settings b. Blending Equipment: Stainless steel high-speed blender with enclosed chamber to prevent material loss c. Tumbling Equipment: Food-safe concrete mixer or similar rotating vessel with smooth interior surfaces d. Optional Components: Dry ice supply system, temperature monitoring equipment, particle size analysis tools.

The invention produces various infused products suitable for different applications: a. Pre-rolled products in various sizes and configurations b. Loose infused substrate for consumer packaging c. Measured doses using food-safe molds for consistent portioning d. Commercial bulk products for further processing or packaging.

The resulting products exhibit superior characteristics compared to conventional infused products: a. Uniform potency throughout the entire product b. Smooth combustion without harsh or acrid smoke c. Even burn rate without running or canoeing d. Preserved terpene profiles and full-spectrum effects e. Extended shelf life due to absence of added liquids or solvents.

EXPERIMENTAL EXAMPLES

Example 1: Multi-Concentrate Infusion

Various concentrated extracts (sugar, badder, rosin) totaling 50 grams were placed in a cryogenic freezer at −80° C. for 45 minutes. The frozen concentrates were blended for 90 seconds to produce a uniform powder. This powder was combined with 450 grams of ground organic substrate (e.g., cannabis flower) in a food-safe tumbler and mixed for 5 minutes. The resulting product demonstrated uniform potency distribution with smooth combustion characteristics.

Example 2: High-Potency Formulation 100 grams of mixed concentrates were cryogenically frozen at −100° C. for 30 minutes with dry ice addition during blending. The powdered concentrate was combined with 200 grams of substrate (e.g., cannabis flower) (1:2 ratio) and tumbled for 7 minutes. Testing confirmed consistent potency throughout with no harsh combustion characteristics.

Example 3: Commercial-Scale Production

In a scaled production run, 1 kilogram of various concentrates was processed through the cryogenic system at −80° C., powderized in industrial blending equipment, and combined with 5 kilograms of substrate (e.g., cannabis flower). The 6-kilogram batch showed uniform distribution and consistent quality across all samples tested.

The following claims are thus to be understood to include what is specifically illustrated and described above, what is conceptually equivalent, what can be obviously substituted and also what incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method for infusing organic substrates with concentrated extracts comprising: a. cryogenically freezing one or more concentrated extracts to a temperature between −30° C. and −196° C.; b. converting said frozen concentrated extracts into a powder form; c. combining said powder with ground organic substrate material, wherein the ground organic substrate material comprises cannabis flower; d. tumbling said combined materials in mixing equipment until homogeneous distribution is achieved; and e. producing an infused organic product having uniform distribution of said concentrated extracts throughout said substrate.

2. The method of claim 1, wherein said cryogenically freezing step utilizes a cryogenic freezer maintaining temperatures between −30° C. and −196° C.

3. The method of claim 1, wherein said concentrated extracts are selected from the group consisting of sugar, badder, crumble, rosin, water hash, live resin, high terpene extract, THCA isolate, and combinations thereof.

4. The method of claim 1, wherein said converting step utilizes stainless steel blending equipment operating for between 30 seconds and 2 minutes.

5. The method of claim 1, wherein said powder has a particle size distribution between 10 and 500 microns.

6. The method of claim 1, further comprising adding dry ice during said converting step to maintain subzero temperatures and prevent clumping.

7. The method of claim 1, wherein said combining step uses a ratio of concentrated extract to substrate between 1:20 and 1:1 by weight.

8. The method of claim 1, wherein said tumbling step utilizes food-safe mixing equipment for between 2 and 10 minutes.

9. The method of claim 1, wherein said method is performed without addition of solvents, terpenes, or liquid carriers.

10. The method of claim 1, wherein multiple types of concentrated extracts are frozen and converted simultaneously to create blended products.

* * * * *